United States Patent [19]

Funahashi

[11] Patent Number: 4,497,010

[45] Date of Patent: Jan. 29, 1985

[54] ABNORMALITY DETECTING DEVICE

[75] Inventor: Soukichi Funahashi, Hachioji, Japan

[73] Assignee: Konishiroku Photo Industry Co., Ltd., Tokyo, Japan

[21] Appl. No.: 436,561

[22] Filed: Oct. 25, 1982

[30] Foreign Application Priority Data

Oct. 30, 1981 [JP] Japan ............................ 56-174892

[51] Int. Cl.³ .............................................. H02H 3/08
[52] U.S. Cl. ....................................... 361/93; 361/98; 307/352
[58] Field of Search ............ 361/93, 94, 86, 88, 361/89, 87, 98; 307/351, 352, 353, 134; 330/298, 207 P; 324/158 T

[56] References Cited

U.S. PATENT DOCUMENTS

| | | | |
|---|---|---|---|
| 4,019,096 | 4/1977 | Bullinga | 361/86 |
| 4,065,802 | 12/1977 | Mizvkawa et al. | 361/86 X |
| 4,073,009 | 2/1978 | Andow et al. | 307/352 X |
| 4,370,571 | 1/1983 | Andow et al. | 307/353 |

Primary Examiner—Patrick R. Salce
Attorney, Agent, or Firm—Jordan B. Bierman

[57] ABSTRACT

An abnormality detecting device for detecting whether a load is in a normal condition or not, comprises a switch connected with the load in series, a control for the switch to apply a test voltage to the load for a time so short that the switch is not damaged even when the load is in a condition of short circuiting, a detector for detecting a current through the load upon application of the test voltage, a circuit for sampling and holding the detection signal, and a comparator for comparing the sampled detection signal with a predetermined abnormality value. The detecting device is particularly suited for detecting short-circuit conditions such as in a copying machine.

2 Claims, 2 Drawing Figures

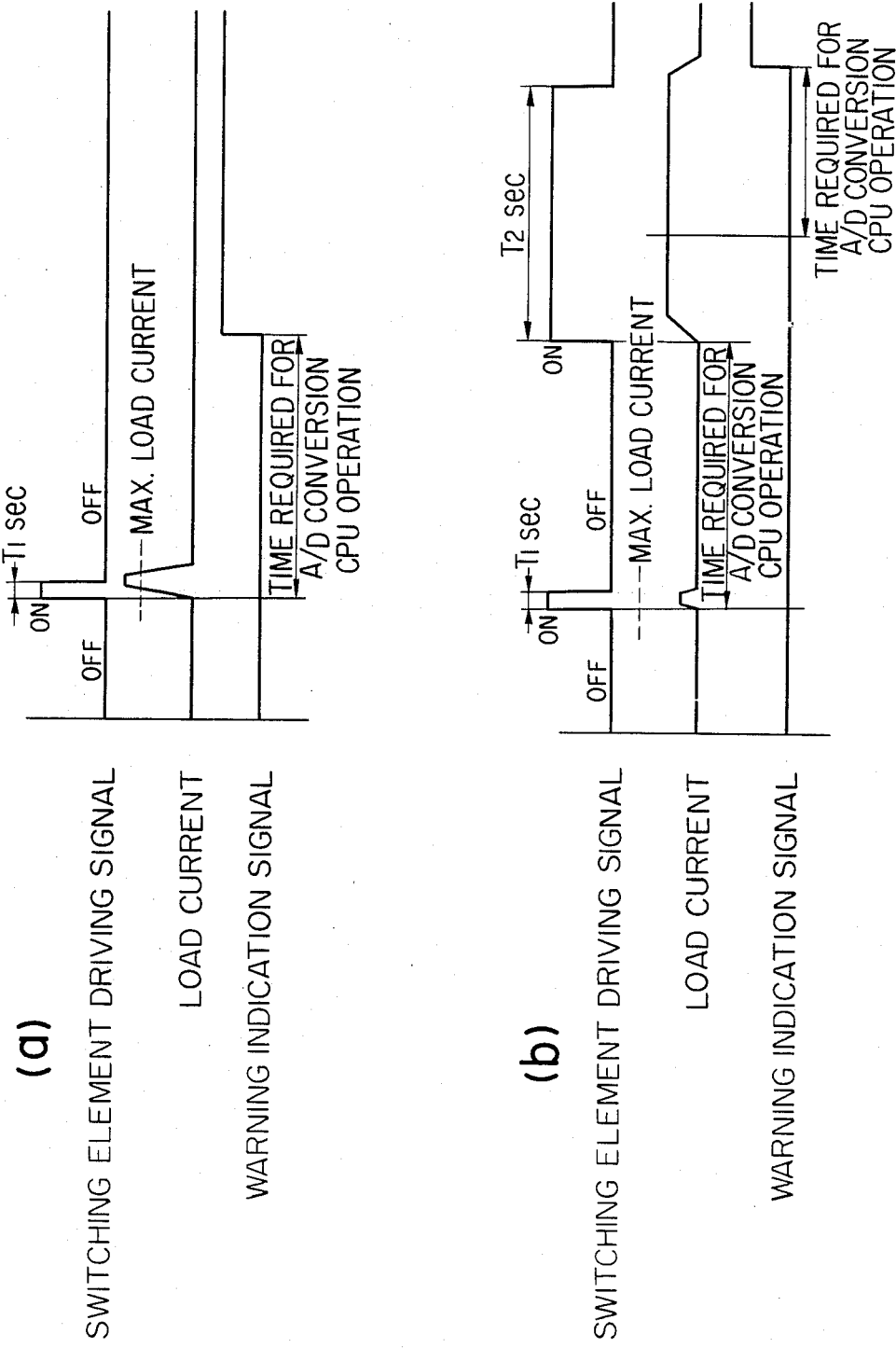

ABNORMALITY DETECTING DEVICE

BACKGROUND OF THE INVENTION

1. Field of the Invention:

The present invention relates to the improvement of an abnormality detecting device that detects the abnormality of the electric load driven by the switching element.

2. Description of the Prior Art:

As a method to detect the abnormality caused by the disconnection or short-circuit of a load driven by a switching element, there has been a method to detect the current running through the load or the voltage between both ends of the load. For example, for the detection of an abnormality in the exposure lamp of the copying machine as a load, there has been known a method wherein the voltage between both ends of the exposure lamp is detected and fed back to the controlling section thereby the signals are generated indicating any abnormality of the exposure lamp if the regular voltage is not generated at both ends of the exposure lamp when it is to be lit. In the aforesaid prior art, it has been unavoidable that the switching element is damaged in case of a short-circuit on the load side even though the abnormal lighting or disconnection of the lamp as a load can be detected.

In the device to detect the short-circuit of the load by detecting the load current, as an example, the switching element connected to the load is closed, and the load current is detected and converted to a voltage value and thereafter converted to a digital value by an A/D converter to be read by CPU. When judged as an abnormality after comparison with a standard value stored in advance in memory, there is the possibility of damage to the switching element in the case of the short-circuit of the load even if the switching element is then opened because the switching element is closed during the period of conversion time of the A/D converter and of the necessary time to open the switching element of CPU.

SUMMARY OF THE INVENTION

The present invention has been devised with an object to solve such drawback of the conventional abnormality detecting method and said object is attained by the abnormality detecting device wherein a switching element is closed for a certain period of time and detection of the current running through a load connected in series to the switching element is converted to a voltage signal, the voltage signal is sample held and thereby an abnormal situation of the load is detected by comparing the sample held value with a standard value.

Namely, in the present invention, right before the switching element in the ordinary process sequence is closed, the switching element is closed for the extremely short period of time that will not cause the switching element to be damaged even if the load side is in the short-circuit situation. The load situation detecting signal thus obtained is held for a while to be compared with a standard value established in advance for the detection of the abnormality in the load situation. Thus the present invention makes the detection of abnormality in the load possible without causing the switching element to be damaged by the short-circuit situation on the load side.

BRIEF DESCRIPTION OF THE DRAWINGS

FIG. 1 shows a circuit diagram of an example of the present invention and FIG. 2 shows a timing chart thereof.

DETAILED DESCRIPTION OF THE PREFERRED EMBODIMENT

Figure 1:
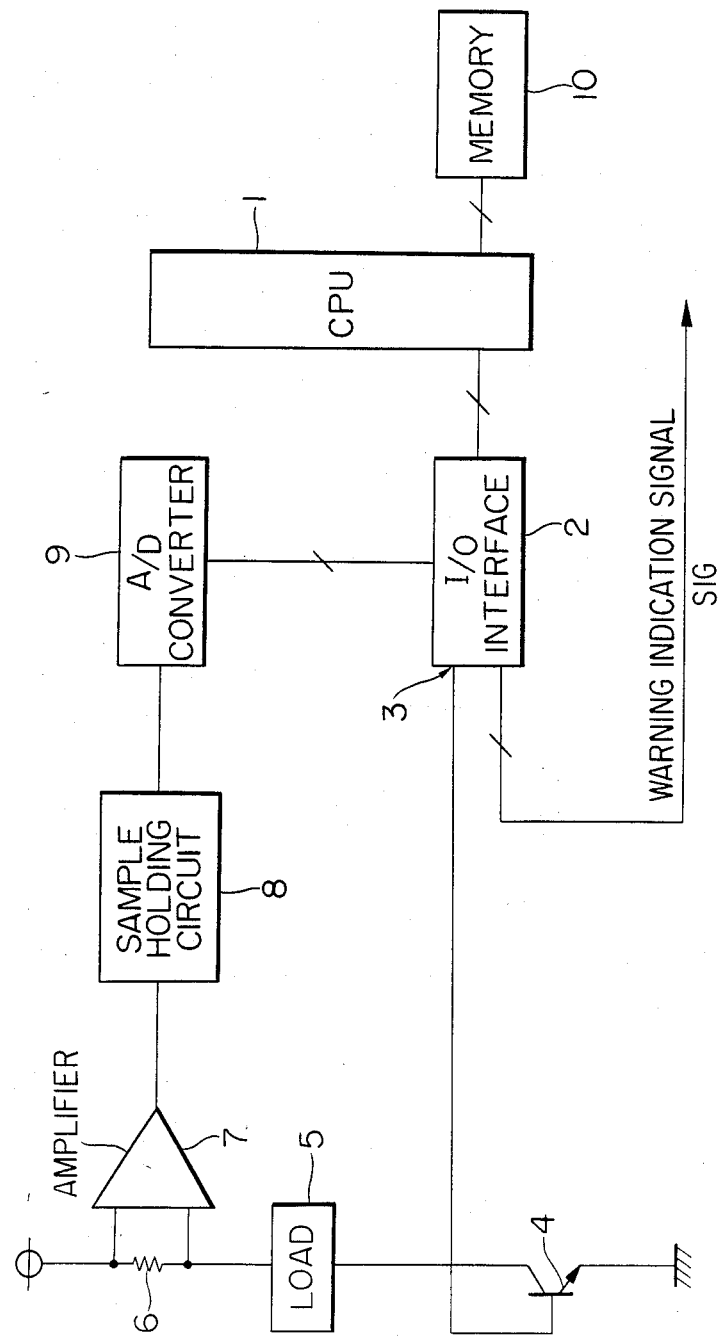

An abnormality detecting device according to the present invention generates ON signal pulses which are short enough not to damage the switching element even in the case of short-circuit of the load prior to the ON signal pulses of the switching element for the detection of regular current. The device converts the voltage value held through the sample hold circuit into a digital value and generates signals to warn and indicate the abnormality without generating the following ON signal pulses when the digital value is judged as an abnormal value. FIG. 1 shows a circuit diagram for the example of the invention and FIG. 2 shows a timing chart thereof.

In FIG. 1, the signals to turn the switching element 4 ON are outputted for the period of $T_1$ seconds from the output port 3 of the I/O interface 2 connected to CPU 1 first. The current running through the load 5 for that period is detected by the voltage drop between both ends of the low resistance 6 put in series in the load circuit. Here, $T_1$ seconds is a set short period of time through which the switching element 4 will not be damaged even in the case of the short-circuit of the load.

The voltage drop between both ends of the resistance 6 is amplified in voltage by the amplifier 7 and is held by the sample hold circuit 8 for a certain period of time. This held value is converted by the A/D converter 9 into a digital value and is read by CPU 1.

When the value read by CPU 1 (corresponding to the load current) and the maximum load current of the load 5 stored in memory 10 in advance and expressed digitally are compared and when it is judged that the maximum value is exceeded, the signal SIG is outputted from the I/O interface 2 through CPU 1 in order to warn and indicate the abnormality of the load circuit. FIG. 2(a) shows a timing chart under which the short-circuit of the load is detected.

Further, when the current value corresponding to the load current is not more than the maximum value, the signal to turn aforesaid switching element 4 ON for the period of $T_2$ seconds is outputted and the regular current of the load is detected and is read by CPU 1 after the A/D conversion and then is compared with a regular upper limit value of load current and a regular lower limit value of the load 5 stored in the memory 10 in advance. Thereby, the abnormality or normality of the load circuit is judged and according to each situation thereof, the signal SIG to warn and indicate outside is outputted. Here, $T_2$ seconds is the one set so that it is longer than the time necessary for the load current to reach its normal state. If the load does not short-circuit, the voltage signal from the amplifier 7 does not have to be fed to the A/D converter 9 through the sample and hold circuit. FIG. 2(b) shows a timing chart in the case where a short-circuit of the load is not detected.

The foregoing is an explanation made referring to the example wherein the present invention prevents the switching element from being damaged even when the load side is in a condition of short-circuit. Thus, it has an excellent effect that the abnormal situation of the load can be detected without causing damage to the switching element.

The present invention can be employed effectively for the abnormality detection for various types of electrical equipments and it is especially effective for the abnormality detection of each element of the copying machine (e.g. exposure lamp, fixing lamp and corona charger etc.).

What is claimed is:

1. An abnormality detecting device for detecting whether a load is in a normal condition or not, comprising: switching means connected with said load in series; control means for controlling said switching means to apply a test voltage to said load for a time so short that said switching means is not damaged even when the load is in a condition of short-circuiting; detecting means for detecting a current through said load upon application of said test voltage and for providing a detection signal; a sample and hold circuit which samples and holds the detection signal; and comparing means for comparing the sampled detection signal with a predetermined abnormality value.

2. The abnormality detecting device described in claim 1, further comprising an analog to digital converter for converting said detection signal supplied from said sample and hold circuit to a digital signal, and wherein the sample and hold circuit holds the detection signal for a period of time longer than the time required for analog to digital conversion and comparison of the detection signal by said comparing means.

* * * * *